Nov. 30, 1971   J. JULLIEN-DAVIN   3,623,371
PRESSURE TRANSDUCERS

Filed Feb. 24, 1969   2 Sheets-Sheet 1

United States Patent Office 3,623,371
Patented Nov. 30, 1971

3,623,371
PRESSURE TRANSDUCERS
Jean Jullien-Davin, Valence, France, assignor to
Crouzet, Paris, France
Filed Feb. 24, 1969, Ser. No. 801,260
Int. Cl. G01l 9/14, 19/04
U.S. Cl. 73—393                                5 Claims

ABSTRACT OF THE DISCLOSURE

A differential pressure transducer in which a diaphragm forms a separation between two chambers. One of said chambers is subjected to a reference pressure whilst the other chamber is intended to receive the gas whose pressure is to be measured. The displacements of the diaphragm are measured by electromagnetic displacement-detection means having a winding connected to a measuring bridge and constituting one arm of said bridge. The detection means are disposed in one of the chambers which is inaccessible to said gas.

---

The present invention relates to pressure transducers of the type comprising a pressure-sensitive diaphragm and electromagnetic means for displacement detection which serves to measure the deflection of the diaphragm.

There already exist many different designs of pressure transducers of the type, for example, in which a diaphragm of magnetic material is fitted within an enclosure so as to subdivide this latter into two separate chambers in which a reference pressure and the pressure to be measured are respectively maintained, the displacements of the diaphragm being measured by means which consist of two magnetic circuits each comprising one winding and having a very small air gap on each side of said diaphragm, the variations in said air gap being intended to modify the inductance and magnetic leakage. The two windings are usually employed in an electric bridge circuit. The gas whose pressure is to be measured is introduced into the measuring chamber, surrounds one of the magnetic circuits and therefore fills the air gap. In point of fact, if this gas contains solid impurities, the operation of the apparatus is adversely affected, especially if the impurities are magnetic. A transducer of this type is therefore not suitable for the measurement, for example, of pressures of gases which are derived from the combustion of a propelling charge and which are therefore liable to contain solid impurities.

The aim of this invention is to provide a presssure transducer for the measurement of high absolute or differential pressures, especially of gases at high temperature (although this is not an essential application), said gases being charged with solid and in many cases magnetic impurities which are derived from the combustion of a propelling charge.

A further aim of the invention is to provide a pressure transducer which embodies all the characteristics required for an application of this type and which is accurately responsive, insensitive to variations in ambient temperature, capable of controlling pressure of gas at high temperature which is charged with solid and even magnetic impurities, which provides a high degree of reliability and comprises integrated control and testing means for simulating the existence of a pressure in order to check not only the operation of the transduced itself but of any installation to be controlled by said transducer (without thereby entailing the need of partial disconnection which is always hazardous by reason of the possibility of any oversight or faulty reconnection); which is capable of withstanding without damage peak pressures which are a multiple of the normal operating pressure and of remaining responsive in order to deliver a signal when the pressure attains a value which is a very small fraction of the normal pressure.

The pressure transducer in accordance with the invention has a pressure-sensing element comprising a pressure-sensitive diaphragm connected at the peripheral edge thereof to a support with which said diaghragm forms a separation between two chambers such that one of said chambers is subjected to a reference pressure whilst the other chamber is intended to receive the gas whose pressure is to be measured, the displacements of the diaphragm being measured by electromagnetic displacement-detection means having a winding connected to a measuring bridge and constituting one arm of said bridge, and is characterisized in that the electromagnetic displacement-detection means are disposed in one of the chambers which is inaccessible to said gas.

In preferred embodiments thereof, the novel pressure transducer can also have the following properties:

In order to compensate for the action produced on the balance of the bridge by the temperature of the gas whose pressure is to be measured, there is incorporated with said pressure-sensing element an identical auxiliary pressure-sensing element in which the winding of the electromagnetic detection means constitutes a second arm of the bridge, the two sensing elements and the measuring bridge being grouped together so as to constitute a pressure probe;

In order to eleminate the influence of the temperature on the voltage gradient as a function of pressure, at least a portion of one arm of the bridge is formed of copper;

In order to adjust the output voltage at the time of assembly to a uniform value which permits interchangeability of the pressure-sensing elements without requiring recalibration thereof, the two measuring-bridge nodes located opposite to the supply points are connected to a voltage divider constituted by a fixed resistor connected in series with an adjustable resistor consisting of a fixed resistor connected in series with another resistor which is shunted by an adjustable resistor having a negative temperature coefficient;

The particular chamber of the auxiliary sensing element which contains the electromagnetic detection means is adapted to communicate with a duct which can be temporarily connected to a pressure source in order to permit checking of the operation of the transducer;

The diaphragm of the pressure-sensing element or of each sensing element is applied at the periphery thereof against a flat surface of an annular support which defines that chamber in which the lower pressure must prevail, the edge of said diaphragm and the corresponding thinned edge in the form of a lip of the annular support being tightly welded together, this welded joint being located at a sufficient distance from the useful portion of the diaphragm in the radial direction to ensure that said useful portion is free from internal stresses.

All of the foregoing properties as well as further characteristics will be more clearly brought out by the following detailed description which is given in connection with one exemplified embodiment as shown diagrammatically in the accompanying drawings, wherein.

Figure 1:
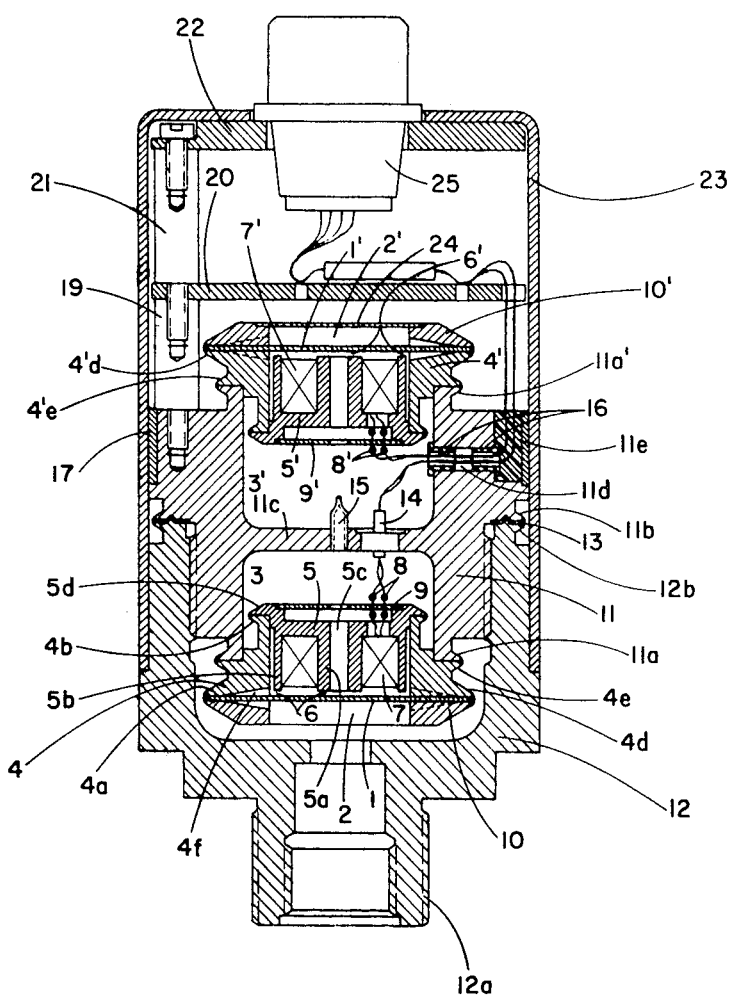
FIG. 1 is a longitudinal sectional view of the transducer.

As shown in FIG. 1, a circular diaphragm 1 forms a separation between a measuring cavity 2 of a chamber 3 which is subjected to a reference pressure. One face of the diaphragm 1 is applied against a flat circular surface 4a forming part of an intermediate support 4. Said support 4 is fitted with a magnetic armature 5 comprising a central core 5a and a pot or side wall 5b, the magnetic circuit between said core 5a and said side wall 5b being closed by the diaphragm 1 so as to leave a very small air gap 6.

An opening 5c provides a communication between the inner wall of the diaphragm 1 and the reference chamber 3. A winding 7 is placed around the core 5a. The input and the output of the winding 7 are brought out to terminals 8 which are carried by an insulating plate 9. The armature 5 which is fitted within the bore of the support 4 is rigidly fixed by means of a circular weld (formed in an argon atmosphere according to a known method) around the periphery of the thinned edges of the lips 5d, 4b of the armature and of the support.

The diaphragm 1 is secured to the support 4 by means of a welded joint formed along the edge of the thinned lip 4d, said welded joint being located at a sufficient distance away from the useful central portion of the diaphragm in the radial direction to ensure that said central portion should not be subjected to any internal stresses and strains. A backing-plate 10 having a thinned edge and having a design function which will be explained hereinafter is applied against the other face of the diaphragm 1 and is welded at the same time.

The support 4 is in turn fitted within a body 11 and permanently joined to this latter in leak-tight manner by means of a welded joint formed along the thinned lips 4e, 11a. The body 11 defines the reference chamber 3 whilst a screwed end-cap 12 fitted with a coupling end-piece 12a is screwed on the body 11 with interposition of a seal 13 and defines the measuring chamber 2.

In this demountable form of the apparatus, the measuring chamber can be opened and cleaned if the gas introduced therein is charged with a substantial proportion of solid impurities. In a non-demountable form of construction, the seal 13 is dispensed with and leak-tightness is ensured by means of a welded joint formed at the periphery of the thinned lips 11b, 12b.

A pressure which is developed within the cavity 2 causes the diaphragm 1 to undergo a deflection, thereby producing a variation in the air gap 6 and modifying on the one hand the permeability of the magnetic circuit and on the other hand magnetic leakage; this results within the winding 7 which is supplied with alternating current in a variation of inductance and a variation of impedance which is a function of the pressure developed.

A measurement of the impedance variation is taken in known manner by means of a bridge circuit in which the winding 7 constitutes a first arm, means being provided on the one hand in order to compensate for the phase rotation produced by the inductance coil 7 and on the other hand in order to compensate for the influence of ambient temperature, whether this influence is produced by a variation in the temperature coefficient of copper or by a variation in magnetic permeability or variation in air gap. Said compensating means consist of an auxiliary transducer which is designated by the reference numerals 1' to 10' and which is identical with the transducer having the reference numerals 1 to 10. The body 11 is common to both assemblies and the winding 7' of the auxiliary transducer constitutes the second arm of the bridge.

Figure 2:
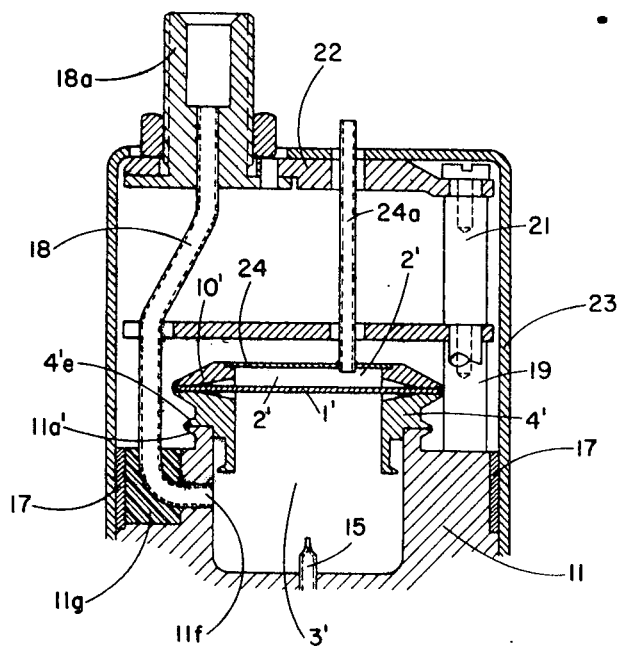
FIG. 2 is a partial longitudinal sectional view taken in a plane disposed substantially 180° to the plane of FIG. 1.
Figure 3:
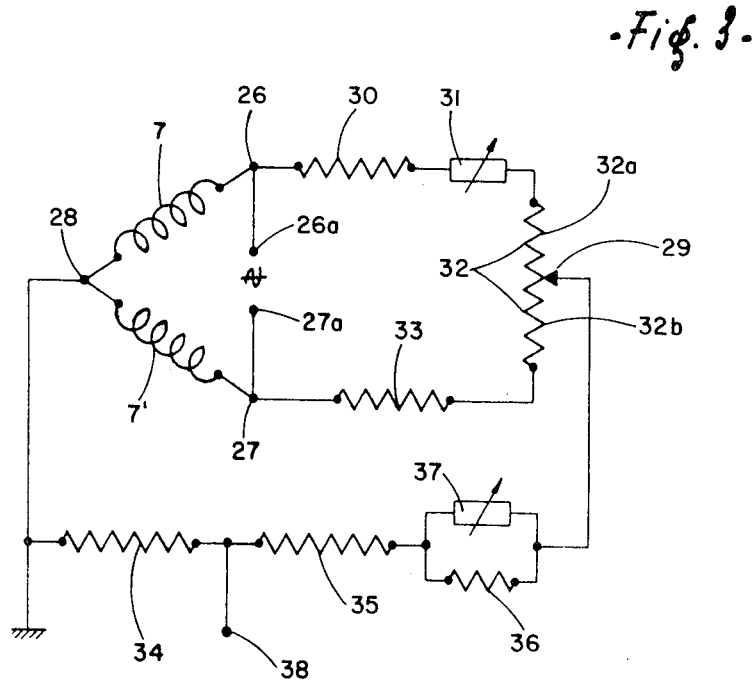
FIG. 3 is a diagram of the measuring bridge.

The reference chambers 3 and 3' are separated by a partition wall 11c in which are fitted leak-tight electric bushing insulators 14 of the glass bead type, for example, and this partition wall is traversed by a tube 15 which can be adapted to communicate with the exterior for the supply of a reference pressure or to serve as an exhaust tube for evacuating and sealing the chamber 3 (as shown in the example of FIG. 1). The lead-out wires of the coils 7 and 7' which are connected to the terminals 8, 14 and 8' pass out of the chamber 3' through radial through-passages such as the passage 11d which are fitted with insulating shield tubes 16 and open into an outer recess 11e limited radially by an added ring 17. The recess 11e is filled with a resin which can be polymerized in the cold state and ensures leak-tightness. Another radial through-passage 11f (as shown in FIG. 2) opens into a recess 11g and permits the assembly of a tube 18 fitted with an end-piece 18a for connecting the chamber 3' to a pressure source. The recess 11g which is limited by the ring 17 is filled with a cold-polymerization resin which ensures leak-tightness (the commercial product known by the name of Araldite is suited to this purpose). Attachment of the tube 18 by this method is necessary since it can be carried out only after welding of the lips 4'e, 11a'; in point of fact, at that moment, the presence of the coils 7 and 7' does not make it possible to contemplate conventional welding (or brazing) of he tube 18 to the body 11.

Pillars 19 are adapted to support an insulating printed-circuit plate 20 on which are mounted the bridge elements other than the windings 7 and 7'. Pillars 21 form extensions of the pillars 19 in order to support an end-plate 22 on which is mounted an electric connector 25 and the end-piece 18a. The complete unit is enclosed within a thin-walled casing 23.

The cavity 2' is limited by a cover 24 which is applied against the backing-plate 10' and a small tube 24a serves to connect said cavity to the atmosphere.

Any space formed within the interior of the cover 23 is filled with a coating product in accordance with a known process.

The bridge comprises in known manner two supply points 26 and 27 which are connected to the alternating-current supply terminals 26a, 27a and two output points or nodes 28 and 29 and one of these latter, namely the point 28, is connected to ground. The bridge is characterized in that one arm between the points 26 and 28 is constituted by the winding 7 whilst another arm between the points 27 and 28 is constituted by the identical winding 7', in that a third arm between the points 26 and 29 comprises in series a resistor 30, a resistor 31 and the portion 32a of a resistor 32, the other portion 32b of which is connected in series with a resistor 33 and constitutes the fourth arm between the points 27 and 29.

The ratio of resistances 32a, 32b, which is either adjustable or constituted by two fixed resistors makes it possible to find the point of balance of the bridge at which the output voltage is zero when no pressure is developed. Variations in temperature do not exert any influence on the point of balance, the influence exerted on the winding 7 being counteracted by the influence exerted on the winding 7'.

On the other hand, in the presence of a pressure which is introduced, the output voltage at terminal 38 is a linear function of the pressure, the angular coefficient or voltage gradient of which varies slightly with the temperature. This variation is compensated by the influence of temperature on the resistor 31 which is formed of copper and which represents a predetermined portion of the arm 30–31–32a.

Since provision must be made for the possibility of mounting a number of transducers in order that one transducer may be replaced by another without entailing recalibration, a voltage divider 34 having a resistance of the order of 10 kilohms and a resistor which is adjusted at the time of assembly and comprises in series a resistor 35 and a resistor 36 shunted by a resistor 37 having a negative temperature coefficient serves to adjust at the time of assembly the output voltage which is collected at the terminal 38.

The integrated testing means are constituted by the compensation transducer (references 1' to 10'). It is merely necessary to introduce a known pressure into the chamber 3' through the tube 18 in order to produce at the output of the bridge the same effect as a pressure to be measured which is introduced into the cavity 2, thereby permitting a general check of the entire operation.

The fact of disconnecting the end-piece 18a restores the unit to the operating condition without any risk of omissions or errors of operation.

The backing-plate 10' is necessary for the purpose of limiting the useful portion of the diaphragm 1' at the time of testing. This clearly shows the necessary function of the plate 10 for ensuring symmetry of construction which is as nearly perfect as possible and thus guarantees excellent thermal compensation.

Finally, when the chamber 3 is evacuated, the diaphragm 1 which is applied against the body 4 is liable to retain between the two surfaces a residual pressure which would be subsequently released; radial grooves such as the groove 4f are provided in order to overcome this difficulty.

What is claimed is:

1. A pressure transducer comprising, in combination: a main pressure-sensing element including a pressure-sensitive diaphragm, a support, a first chamber disposed on one side of said diaphragm, and a second chamber disposed on the opposite side of said diaphragm; said diaphragm being connected at its edge to said support; first means connected to said first chamber for subjecting said first chamber to a reference pressure; second means connected to said second chamber for subjecting said second chamber to a pressure to be measured; electromagnetic displacement-detection means disposed within said first chamber for measuring displacements of said diaphragm; a measuring bridge; said electromagnetic displacement-detection means including a winding which is connected to said measuring bridge and which constitutes one arm of said measuring bridge; an auxiliary pressure-sensing element which is identical to said pressure-sensing element for compensating for the action produced on the balance of said measuring bridge by the temperature of the fluid whose pressure is to be measured; said auxiliary pressure-sensing element including a pressure-sensitive diaphragm, a support, a first chamber disposed on one side of said diaphragm, and a second chamber disposed on the opposite side of said diaphragm and exposed to the atmosphere; a common support body to which said main pressure-sensing element and said auxiliary pressure-sensing element are both affixed; said auxiliary pressure-sensing element including electromagnetic displacement-detection means having a winding which is connected to said measuring bridge and which constitutes a second arm of said measuring bridge; and said main pressure-sensing element, said auxiliary pressure-sensing element and said measuring bridge being grouped together in a housing to constitute a pressure probe.

2. A pressure transducer as defined in claim 1, wherein at least one portion of said second arm of the bridge is formed of copper in order to remove the influence of temperature on the voltage gradient as a function of pressure.

3. A pressure transducer as defined in claim 1 wherein said measuring bridge includes two input supply points and two output measurement nodes which are located opposite to said input supply points and are connected to a voltage divider, said voltage divider comprising a first fixed resistor connected in series with an adjustable resistor including a second fixed resistor connected in series with another resistor that is shunted by an adjustable resistor having a negative temperature coefficient so that adjustment of said adjustable resistor at the time of assembly permits interchangeability of pressure transducers without requiring recalibration thereof.

4. A pressure transducer as defined in claim 1, including a tube which communicates with the chamber of said auxiliary pressure-sensing element which contains the electromagnetic displacement-detection means for temporarily subjecting this chamber to a known pressure so that the operation of the transducer may be checked.

5. A pressure transducer as defined in claim 1, wherein the diaphragm of each pressure-sensing element is applied at the periphery thereof against a flat surface of an annular support which defines one of said first and second chambers in which the lower pressure must prevail, the edge of said diaphragm and the corresponding thinned edge in the form of a lip of the annular support being tightly welded together.

References Cited
UNITED STATES PATENTS

| | | | |
|---|---|---|---|
| 2,483,300 | 9/1949 | Howe | 73—398 |
| 2,507,501 | 5/1950 | Clark | 73—398 X |
| 2,729,730 | 1/1956 | Brady | 73—398 X |
| 2,958,056 | 10/1960 | Giovanni | 73—398 |

FOREIGN PATENTS

| | | | |
|---|---|---|---|
| 969,884 | 5/1950 | France | 336—30 UX |

LOUIS R. PRINCE, Primary Examiner

D. M. YASICH, Assistant Examiner

U.S. Cl. X.R.

73—398 R, 406

UNITED STATES PATENT OFFICE
CERTIFICATE OF CORRECTION

Patent No. 3,623,371  Dated November 30, 1971

Inventor(s) Jean JULLIEN-DAVIN

It is certified that error appears in the above-identified patent and that said Letters Patent are hereby corrected as shown below:

In column 1, between lines 5 and 6, insert the following:

"Claims priority, Application France, February 26, 1968, 141,515."

Signed and sealed this 11th day of July 1972.

(SEAL)
Attest:

EDWARD M. FLETCHER, JR.
Attesting Officer

ROBERT GOTTSCHALK
Commissioner of Patents